May 3, 1932.  A. BARÉNYI  1,856,308

PHOTOGRAPHIC SHUTTER

Filed Jan. 9, 1931

Inventor
Árpád Barényi
by Franz Reinhold
Attorney

Patented May 3, 1932

1,856,308

UNITED STATES PATENT OFFICE

ÁRPÁD BARÉNYI, OF BERLIN-LICHTERFELDE, GERMANY

PHOTOGRAPHIC SHUTTER

Application filed January 9, 1931, Serial No. 507,601, and in Germany January 27, 1930.

My invention relates to improvements in photographic shutters and more particularly in the type of pivoted blade, symmetrical opening shutter. In the application for Patent Ser. No. 376518 filed by me August 8, 1929, I have described a shutter in which two latches are provided which are successively retracted from the housing of the motor or master member, one of said latches being retracted prior to the other one for permitting the housing to be slightly rotated until it is again arrested by the second one, and being thrown into the position in which it is ready to engage the next lug of the housing. In the construction shown in the said application the latches are operated by the same operating lever. The object of the improvements is to provide a shutter operating mechanism of this type in which the first latch is retracted and brought into the position in which it is ready to engage the next lug of the housing before the operating member releasing the housing is operated, and with this object in view my invention consists in retracting said first named latch from the master member by means of a member which is operated prior to the operating lever, and in the preferred construction the said first named latch is retracted from the master member by the setting lever thereof.

Figure 1:
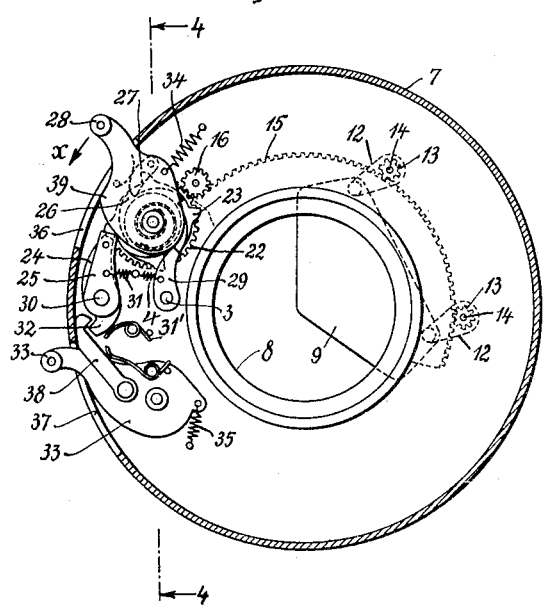
Figure 4:
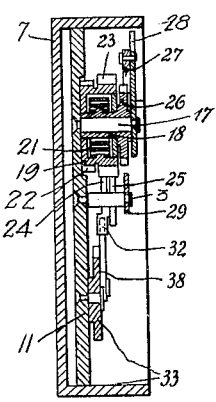
Figure 2:
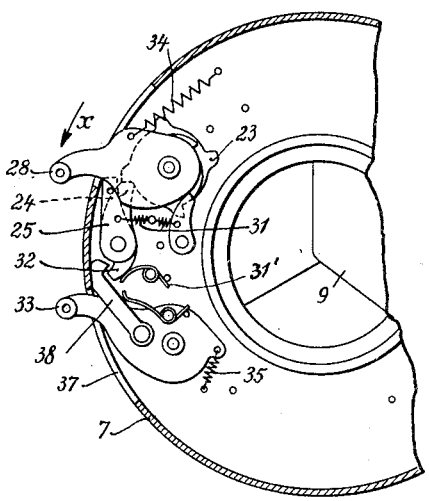
Figure 3:
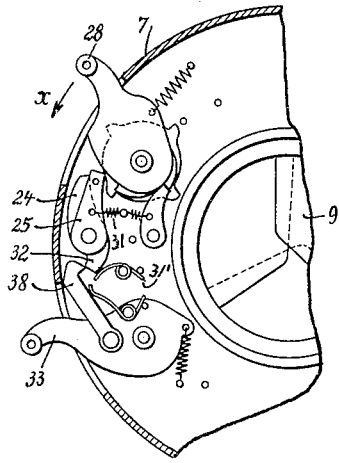

For the purpose of explaining the invention an example embodying the same has been shown in the accompanying drawings in which the same reference characters have been used in all the views to indicate corresponding parts. In said drawings, Fig. 1 is an elevation partly in section showing a shutter constructed in accordance with one embodiment of my invention, the motor or master member being shown in non-set position, Fig. 2 is a fragmentary elevation showing the master member in set position, Fig. 3 is a similar elevation showing the housing of the master member released and performing its shutter operating movement, and Fig. 4 is a sectional view taken substantially on the line 4—4 of Fig. 1.

As appears more particularly from Figs. 1 and 4, the shutter comprises the usual annular casing 7 having a central exposure of lens opening 8 normally closed by blades 9, the said blades being confined between the rear wall 10 of the casing and a partition member 11 upon which latter most of the shutter operating mechanism hereinafter described is carried. Each blade is supported on a pair of crank arms 12 connected with pinions 13 rotatable on pivot bolts 14 fixed to the partition member 11, and the said pinions are in mesh with a toothed ring 15 adapted to rotate the pinions and cranks through an angle of 360° for opening and closing the shutter. Fig. 1 shows only two pairs of crank arms 12 and a part of the toothed ring 15, the other pairs of arms being omitted for clearness sake.

Rotary movement is imparted to the ring 15 through the intermediary of a pinion 16 from a motor or master member mounted on a stud 17 and comprising a tubular arbor 18 rotatably mounted on the said stud, a housing 19 rotatably mounted on said arbor, and a spiral spring 21 secured with its ends to said arbor and housing. The housing is formed with a toothed flange 22 meshing with the pinion 16 and with four lugs 23 cooperating with two pawls 24 and 25. The tubular arbor 18 is made integral with a flange 26 formed with four ratchet teeth normally engaged by a latch 29 and a spring-pressed pawl 27 mounted on a setting lever 28. The pawls 24 and 25 are mounted on a pivot bolt 30, and they are pressed into engagement with the lugs 23 by springs 31, 31'. The pawl 29 is mounted on a pivot bolt 3, and it is pressed into engagement with the teeth of the flange 26 by a spring 4. The pawls 24 and 25 are different in length, and normally only the pawl 25 is in locking engagement with one of the lugs 23 while the pawl 24 is idle, as is shown in Figs. 1 and 4. The pawl 24 is formed with a rear extension or heel 32 adapted to be engaged by a pawl 38 mounted on a spring-pressed operating lever 33 for rocking the same out of engagement with the lug 23. The setting lever 28 is formed with a cam face 39 adapted to engage the pawl 25 for rocking the same out of engagement with the lug 23.

The setting lever 28 and the operating lever 33 are acted upon by springs 34 and 35 respectively tending to return the same after operation into initial position, and they extend from the casing 7 outwardly and through slots 36 and 37 limiting their strokes.

If it is desired to make an instantaneous exposure the master member is first set by rocking the setting lever 28 in the direction of the arrow $x$, such rocking movement being transmitted by the pawl 27 to the flange 26 and the tubular arbor 18 for putting the spring 21 under tension. After the master member has thus been set the latch 29 engages the next lug of flange 26, and the housing of the master member tends to rotate in the direction of the arrow $x$.

Near the end of the rocking movement of the setting lever the cam face 39 engages the pawl 25 and rocks the same out of engagement with the lug 23 so that the housing 19 is slightly turned by its spring 21 in the direction of the arrow $x$, until it is arrested by the pawl 24 engaging the said lug. If now the lever 28 is returned by the spring 34 into initial position, the pawl 25 is pressed by the spring 31 on the bevelled outer face of the lug 23 so that it is in position for safely engaging the next lug 23. Now the pawl 24 is retracted from the lug 23 by means of the operating lever 33 and the pawl 38, and the housing 19 is released for imparting rotary movement to the pinion 16 and the toothed ring 15. By thus rotating the ring 15, the pinions 13 and crank arms 12 in one direction the shutter is opened and closed. Finally the housing is arrested by the pawl 25 engaging the next lug 23. When the levers 28 or 33 are released they are retracted into initial positions by the springs 34 and 35 acting thereon, and the pawl 38 pressed by its spring on the inner face of the circumferential wall of the casing 7 slightly rocks the heel 32 of the pawl 24 so that it engages at the rear of the said heel, as is shown in Fig. 1.

While in describing the invention reference has been made to a particular example embodying the same I wish it to be understood that my invention is not limited to the construction shown in the drawings, and that various changes may be made in the general arrangement of the apparatus and the construction of its parts without departing from the invention.

I claim:

1. The combination with the shutter operating mechanism and its master member, of two latches adapted for successive locking engagement with said master member for preventing transmission of the power thereof to the shutter mechanism, and members adapted to be separately operated for throwing said latches out of locking engagement with said master member, the member operating the latch which first engages said master member being constructed for releasing its latch after throwing the same out of locking engagement with said master member.

2. The combination with the shutter mechanism, its master member, and a setting lever therefor, of two latches adapted for successive locking engagement with said master member for preventing the transmission of power to the shutter mechanism, means on the latch first engaging said master member and on said setting lever for throwing said first engaging latch out of locking engagement with the master member and for releasing said first engaging latch, and an operating member for the second latch.

3. The combination with the shutter mechanism, its master member, and a setting lever therefor, of two latches adapted for successive locking engagement with said master member for preventing the transmission of power to the shutter mechanism, said setting lever being formed with a cam in position for engaging the latch first engaging said master member and adapted when setting said setting lever to throw said first engaging latch out of locking engagement with the master member, and an operating member for the second latch.

In testimony whereof I hereunto affix my signature.

ÁRPÁD BARÉNYI.